US009600783B2

(12) United States Patent
Stepanski et al.

(10) Patent No.: US 9,600,783 B2
(45) Date of Patent: Mar. 21, 2017

(54) EVALUATING TOTAL COST OF OWNERSHIP

(75) Inventors: Eugene Stepanski, Heidelberg (DE); Dirk Rohdemann, Muehlhausen (DE)

(73) Assignee: SAP SE, Walldorf (DE)

( * ) Notice: Subject to any disclaimer, the term of this patent is extended or adjusted under 35 U.S.C. 154(b) by 2447 days.

(21) Appl. No.: 12/044,430

(22) Filed: Mar. 7, 2008

(65) Prior Publication Data

US 2009/0228377 A1    Sep. 10, 2009

(51) Int. Cl.
*G06Q 10/06* (2012.01)
*G06Q 40/00* (2012.01)

(52) U.S. Cl.
CPC ............ *G06Q 10/06* (2013.01); *G06Q 40/12* (2013.12)

(58) Field of Classification Search
None
See application file for complete search history.

(56) References Cited

U.S. PATENT DOCUMENTS

| | | | |
|---|---|---|---|
| 2002/0082966 A1* | 6/2002 | O'Brien et al. | 705/36 |
| 2005/0071285 A1* | 3/2005 | Laicher et al. | 705/400 |
| 2006/0184408 A1* | 8/2006 | Giancola et al. | 705/8 |
| 2007/0168874 A1* | 7/2007 | Kloeffer et al. | 715/764 |
| 2007/0208537 A1* | 9/2007 | Savoor et al. | 702/182 |
| 2008/0027568 A1* | 1/2008 | Pearson | 700/80 |
| 2008/0126163 A1* | 5/2008 | Hogan et al. | 705/8 |
| 2008/0162688 A1* | 7/2008 | Reumann et al. | 709/224 |

OTHER PUBLICATIONS

Antonopoulos, Andreas M., "Three Steps to Lower Storage TCO; Cheap Disks Expensive Brains," Network World, Network World Inc., Aug. 29, 2006.*

'Answers to Frequent Questions: Total Cost of Ownership' Federal Electronics Challenge, Sep. 26, 2007, brochure, 5 pages.

'Comparative TCO Analysis of Siebel 7.x CRM Applications on Alternative Platforms' [online], Job Functions, [published Apr. 2005], [retrieved on Oct. 5, 2009]. Retrieved from the internet: http://jobfunctions.bnet.com/abstract.aspx?kw=tco&docid=168138.

Vogel, Robert, 'Quantify the ROI Benefits associated with the Citrix Access Platform' Citrix Solutions Conference 2007, copyright 2007, 24 pages.

(Continued)

*Primary Examiner* — Nathan Erb
(74) *Attorney, Agent, or Firm* — Fish & Richardson P.C.

(57) ABSTRACT

Among other disclosed subject matter, a computer-implemented method for evaluating total cost of ownership (TCO) of a system includes obtaining reference values associated with respective aspects of a TCO measurement model. The TCO measurement model is configured for use in measuring TCO, the reference values reflecting a reference TCO determined for a reference system. The method includes mapping actual expenses to the TCO measurement model, the actual expenses identified as associated with a system whose TCO is to be evaluated. The method includes performing an analysis that includes at least comparing the actual expenses to the reference values according to the mapping. The method includes recording a result of the analysis that indicates at least whether the TCO of the system differs from the reference TCO.

21 Claims, 5 Drawing Sheets

(56) References Cited

OTHER PUBLICATIONS

'Gartner Says Effective Management Can Cut Total Cost of Ownership for Desktop PCs by 42 Per Cent' [online], Gartner, [published on Mar. 10, 2009], [retrieved on Oct. 5, 2009]. Retrieved from the internet: http://www.gartner.com/it/page.jsp?id=636308.
Hoffman, Thomas, 'Gartner: Debunking five myths of TCO—TCO doesn't necessarily mean cutting costs' [online], Computerworld Management, [published on Jun. 11, 2003], [retrieved on Oct. 5, 2009]. Retrieved from the internet: http://www.computerworld.com/s/article/82011/GartnerdebunkingfivemythsofTCO.
'Reducing Total Cost of Ownership (TCO) Through Server Consolidation', [online] Fujitsu Limited Intel Corporation, Mar. 2007 [retrieved on Oct. 5, 2009]. Retrieved from the internet: http://www.fujitsu.com/downloads/PRMQST/documents/Gartner-TCO-Case-study-Eng-realFINAL.pdf.

* cited by examiner

EVALUATING TOTAL COST OF OWNERSHIP

TECHNICAL FIELD

This document relates to evaluating and analyzing total cost of ownership of a system.

BACKGROUND

Today, the decision of choosing a computer system among the available solutions, such as systems for enterprise resource planning, is often driven by two major questions: "What value does a certain solution have to our organization"? and "What must we invest to get that value?". Attempting to answer the second question often involves performing a total cost of ownership (TCO) analysis. Models that help structure and analyze TCO have been developed by system manufacturers, such as SAP AG, and also by third parties, such as the Gartner Group.

Structures of costs depend on a myriad of solution characteristics. However, the key cost clusters usually common to all models are: investments in hard- and software, implementation, operations, update and further improvements of the solution.

The purchase decision for the customer is usually driven by a return-on-investment (ROI) analysis, which in turn depends on TCO. Organizations deploying and using an enterprise software product suite for an enterprise resource planning system (ERP), for example, strive to optimize and decrease their spendings for owning, supporting and operating the product.

SUMMARY

The invention relates to evaluating and analyzing total cost of ownership of a system.

In a first aspect, a computer-implemented method for evaluating total cost of ownership (TCO) of a system includes obtaining reference values associated with respective aspects of a TCO measurement model. The TCO measurement model is configured for use in measuring TCO, the reference values reflecting a reference TCO determined for a reference system. The method includes mapping actual expenses to the TCO measurement model, the actual expenses identified as associated with a system whose TCO is to be evaluated. The method includes performing an analysis that includes at least comparing the actual expenses to the reference values according to the mapping. The method includes recording a result of the analysis that indicates at least whether the TCO of the system differs from the reference TCO.

Implementations can include any, all or none of the following features. The system can have at least one characteristic, and the method can further include identifying the reference values that are to be used in the analysis from among multiple sets of reference values, the reference values identified as being associated at least with the characteristic. The reference values can be included in a template associated with the characteristic, and the reference values can be obtained by obtaining the template. The characteristic can reflect at least one selected from the group consisting of: an industry where the system is used, a size of the system, a size of an organization that uses the system, a country where the system is used, a hardware platform that the system uses, and combinations thereof. The method can further include gathering invoices incurred as a result of operating the system; classifying each of the invoices as being either TCO related or non-TCO-related; and obtaining the actual expenses from at least one of the invoices classified as TCO related. The reference values can be provided from a system manufacturer to a system customer. The provided reference values can be an update of earlier reference values provided to the system customer, the update reflecting a change in legal requirement for operating the system. The system customer can have used the system for a period of time before the analysis, and the system customer can have changed an aspect of how the system is operated before the analysis is performed. The result can identify at least one of the aspects of the TCO measurement model where a difference between the TCO of the system and the reference TCO satisfies a significance criterion. The method can further include determining whether at least one of multiple predefined recommendations should be generated in response to the result; and if so, generating the at least one predefined recommendation. It can be determined that none of the multiple predefined recommendations should be generated, and the method can further include generating a request for support service for the system. The TCO measurement module can include instances of functional elements, including at least: an activity element that represents a defined task to be performed in the system; a monitoring task element that represents an observation task to be performed, including collection of data, to determine whether the system functions properly; an analysis task element representing interpretation and decision-making, based at least on the data collected by the observation task; and a frequency element that connects a functional element with at least one other functional element, selected among another activity element and the monitoring task element, and represents how frequently one functional element results in the other functional element being performed; wherein the reference values are obtained using the functional elements. The method can further include receiving a user selection of an area within the TCO measurement model to be in focus for evaluating the TCO; collecting a structure of the TCO measurement model of the selected area; generating a test plan using the collected structure and contents of the functional elements, including taking into account interdependencies between any of the functional elements; and performing the test plan to obtain at least some of the reference values. The method can further include, before performing the test plan, providing the test plan with a template configured to hold a result of performing the test plan. The method can further include recording the result of the test plan using the template using the structure of the TCO measurement model.

In a second aspect, a computer program product is tangibly embodied in a computer-readable storage medium and includes instructions that when executed by a processor perform a method for evaluating total cost of ownership (TCO) of a system. The method includes obtaining reference values associated with respective aspects of a TCO measurement model, the TCO measurement model configured for use in measuring TCO, the reference values reflecting a reference TCO determined for a reference system. The method includes mapping actual expenses to the TCO measurement model, the actual expenses identified as associated with a system whose TCO is to be evaluated. The method includes performing an analysis that includes at least comparing the actual expenses to the reference values according to the mapping. The method includes recording a result of the analysis that indicates at least whether the TCO of the system differs from the reference TCO.

In a third aspect, a computer system includes a TCO analysis module configured to (1) perform analysis including at least comparing actual expenses to reference values associated with respective aspects of a TCO measurement model according to a mapping, the TCO measurement model configured for use in measuring TCO, the reference values reflecting a reference TCO determined for a reference system, the actual expenses identified as associated with a system whose TCO is to be evaluated, and (2) record a result of the analysis that indicates at least whether the TCO of the system differs from the reference TCO.

Implementations can include any, all or none of the following features. The computer system can be a customer system and can further include earlier reference values provided to the customer system, wherein the provided reference values are an update of earlier reference values, the update reflecting a change in legal requirement for operating the system. A system customer can have used the system for a period of time before the analysis, and the system can further include a changed aspect of how the system is operated, the aspect being changed before the analysis is performed. The system can further include a significance criterion, wherein the result identifies at least one of the aspects of the TCO measurement model where a difference between the TCO of the system and the reference TCO satisfies the significance criterion. The system can further include multiple predefined recommendations, wherein the computer system determines whether at least one of the multiple predefined recommendations should be generated in response to the result; and if so, generates the at least one predefined recommendation. The system can further include a request for support service for the system, wherein if it is determined that none of the multiple predefined recommendations should be generated, the computer system generates the request for support service for the system.

Implementations can provide any, all or none of the following advantages. An improved TCO evaluation can be provided. Deviations of a customer's actual TCO from one recognized as a best practice can be determined by a quantitative analysis. Regular updates can provide adjustment of TCO evaluation to match changing circumstances.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
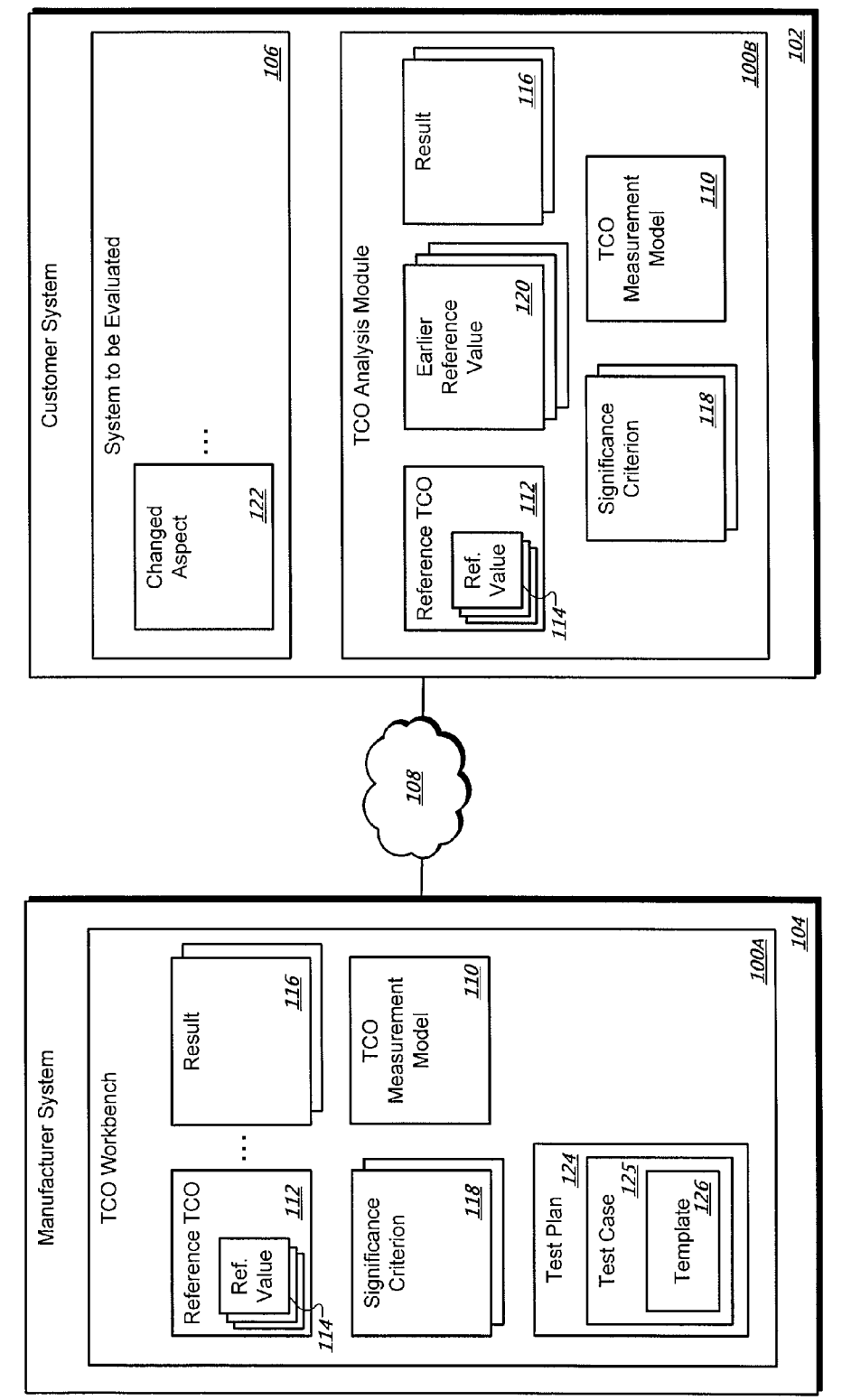
FIG. 1 shows an example of a TCO analysis module that can be used to evaluate TCO for a customer system.

FIG. 1 shows an example of a TCO evaluation and analysis system that includes a TCO workbench 100A and a TCO analysis module 100B. The workbench 100A and the module 100B can be used to evaluate TCO for a customer system 102. Here, the TCO analysis module 100B has been provided from a manufacturer system 104 to the customer system, which can include an ERP system, for example. The manufacturer of the customer system 102 here operates the manufacturer system 104, including the TCO workbench 100A where actually evaluation and analysis can be performed, and has provided the TCO analysis module 100B to the customer so that the TCO of the customer system 102 can be evaluated.

In some implementations, the TCO analysis is to be performed on a system 106 that is part of the customer system 102, here referred to as the system 106 to be evaluated, for clarity. For example, the system 106 can be the ERP portion designed and developed by the manufacturer. TCO can be analyzed for any type of system.

A network 108, such as the internet or an internal network, here connects at least the manufacturer system 104 and the customer system 102 to each other. For example, part or all of the system 106 may have been delivered through the network 108. As another example, the manufacturer may provide the TCO analysis module 100B to the customer through the network 108. It may be possible to forward useful updates to the customer system 102, as will be described in examples below. Such updates can be sent through the network 108. In some implementations, the manufacturer system 104 and the customer system 102 are not connected, or at least not permanently connected, to each other.

The TCO workbench 100A and the TCO analysis module 100B here includes a TCO measurement model 110. The TCO measurement model 110 is configured for use in measuring TCO. For this and/or other purposes, the TCO measurement model 110 may describe aspects relating to the implemented system. The TCO measurement model 110 can be built taking into account intuitive and natural approaches by which an information technology (IT) system is described. For example, the TCO measurement model 110 can be comprised of aspects relating to the ownership of an IT system, such as the need to perform routine administration, to perform monitoring, to provide service and to implement changes. An example of a TCO measurement model will be described below with reference to FIG. 2.

In the illustrated example, at least one reference TCO 112 has been defined. The reference TCO 112 is an assessment, such as a collection of values and/or declarations, that has been determined for a reference system. That is, the reference TCO 112 here represents a benchmark, or a predefined best practices target, that can serve as a reference against which one or more actual TCOs can be compared. One or more reference TCOs can be determined by the manufacturer using a system with optimal configuration. For example, subjecting the reference system to circumstances involving different industry solutions and/or company sizes can yield more than one reference TCO 112 that is relevant for its particular characteristics.

Here, the reference TCO 112 includes one or more reference values 114. Each of the reference values 114 is associated with one or more aspects of the TCO measurement model 110 and reflects the reference TCO 112 in that regard. That is, it can be determined in the best practices analysis of the optimal reference system, for example, the representative time to perform follow-up actions that are necessary as a result of regular monitoring of a system aspect. One or more of the reference values 114 can then be stored with a value (or other information portion) that reflects this determination. The reference values 114 are included in the TCO workbench 100A and the TCO analysis module 100B in this example. Thus, one or more of the reference values 114 can be provided from the system manufacturer and be obtained by the system customer.

The TCO analysis module 100B can take the customer's actual expenses into account in evaluating TCO. In some implementations, the relevant actual expenses are first identified. Assume, for example, that only the TCO for the system 106 is to be evaluated, as opposed to, say, a TCO for the entire system 102 and/or any other system. The relevant expenses can first be analyzed to eliminate non-TCO related expenses. First, any expenses relating solely to any other system(s) can be eliminated, as they do not bear on the TCO for the system 106. Second, some expenses relating to the system 106 may also be considered non-TCO related, for example if they relate only tangentially to the system 106 and do not fall into one of the TCO categories, hence not being TCO-related spending at all. The decision on categorization of costs into TCO-relevant and not TCO-relevant can be made by the customer based on guidance provided in a documentation part accompanying the system 102. Thus, the actual expenses associated with the system 106 whose TCO is to be evaluated can be identified.

The relevant TCO related actual expenses can then be mapped to the TCO cost categories defined by the measurement model 110. For example, actual expenses relating to routine administration, monitoring, service and/or changes can be mapped to any or all of these corresponding aspects of the TCO measurement model 110.

Thus, the customer system 102 can at this point have available at least the reference TCO 112 reflecting a benchmark assessment, and the actual expenses that have been mapped to the appropriate portion(s) of the TCO measurement model 110. The TCO analysis module 100B can therefore perform an analysis that includes at least comparing the actual expenses to the reference values 114 according to the mapping. The analysis can yield results regarding the TCO of the customer system, such as whether the customer system TCO differs significantly from the reference TCO 112. In the present example, the TCO analysis module 100B is located in the customer system 102. In other implementations, the TCO analysis module 100B can perform the analysis elsewhere, such as in the manufacturing system 104. The customer system 102 can then provide the necessary information to the TCO workbench 100A at the other location(s).

The TCO workbench 100A can record any of multiple results 116 of the performed TCO measurement. For example, the results 116 can be used to assess the customer system TCO relative to the reference TCO 112. In any event, the result(s) can be made available to the customer as essentially a real-time assessment of the customer system 102 (or of the system 106, in another example). This can provide the advantage that the customer can benefit from best practices analysis and recommendations regarding a comparable system, and the customer can thus receive valuable insight into whether its system lives up to reasonable expectations. In some implementations, the results 116 provided to the TCO analysis module 100B are less detailed than those stored in the TCO workbench 100A. In some implementations, the results 116 in the TCO analysis module 100B can be reference values, for example calculated by aggregating the values available in the TCO workbench 100A.

The TCO workbench 100A and the TCO analysis module 100B here include one or more significance criteria 118 that relate to the TCO analysis. For example, when comparing actual customer expenses to one or more aspects of the reference TCO 112, one or more of the significance criteria 118 can be used to determine whether a detected difference, or deviation from the reference TCO, is sufficiently significant. In some implementations, the significance criteria 118 can include tolerance parameters that indicate an acceptable range of deviation. For example, if the reference TCO indicates that costs for making changes in the implemented ERP system are generally at most about 20% of the purchase price, then the significance criterion 118 can indicate that an actual expense of about 25% of the purchase price is not considered a significant deviation from best practices. As another example, the significance criterion can take into account that the customer has experienced a lower-than-expected TCO in some other aspect of the TCO measurement model, which could at least in part be the reason for a higher value. Thus, the result 116 can identify at least one of the aspects of the TCO measurement model 110 where a difference between the TCO of the system 102 (or 106) and the reference TCO 112 satisfies the significance criterion 118.

In some implementations, the reference values 114 can be updated over time. For example, the customer system 102 here includes one or more earlier reference values 120, received previously from the manufacturer system 104, for example. As one example, it may be desirable to update one or more of the reference values 114 if some aspect of the reference TCO changes. Such changes, in turn, can be the result of any of many different circumstances. Sometimes, the legal requirements for operating an ERP system can change, for example to require more comprehensive accessibility options or to require enhanced ability to track goods and materials in event of a product recall. Such a change in the legal requirements sometimes affects the best practices TCO and one or more of the reference values 114 can then be provided to the customer system as an update of the earlier reference values 120.

The above example suggests a situation where the customer may decide to change some aspect of the system 102 at some point in time. Changes can also be made for other purposes, such as to improve performance or to ensure compatibility with later-obtained components. Whatever the reason may be for the modification, the customer system can over time come to include one or more changed aspects 122, here illustrated in the system 106. The changed aspects 122 can include a modification in a business process being run in the system, to name just one example. When the changed aspect 122 is finished, a measurement can be performed by the TCO workbench 100A and the TCO analysis module 100B will take into account that the changed aspect 122 now exists. This can provide the customer an assessment of how the changed aspect(s) 122 may have affected the TCO of the customer system.

A test plan 124, a test case 125 and a template 126 will be described in examples below.

Figure 2:
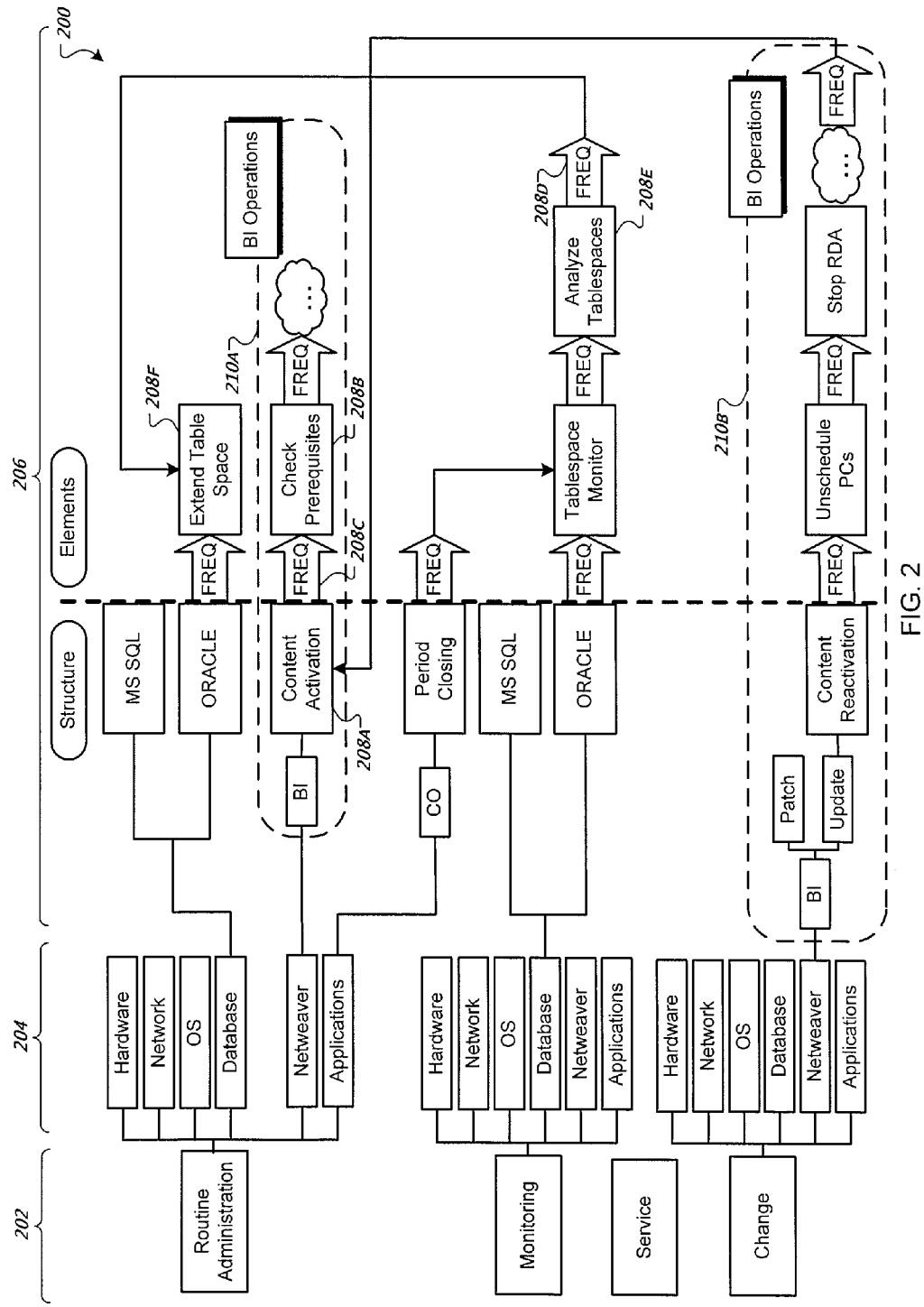
FIG. 2 shows an example of a TCO measurement model.

As noted above, any of several different TCO measurement models can be used. FIG. 2 shows an example of a TCO measurement model 200 that is designed by SAP AG. A measurement process according to the model 200 can be performed, for example by the TCO workbench 100A. At a first level 202 and in some sublayers thereunder, the model 200 is configured to contain structure reflecting TCO costs. This structure can be organized according to the organization's (e.g., the customer company's) views and practices regarding TCO costs. For example, the level 202 can be based on services defined in an operations catalog created by the company. The organization in the level 202 can differ between implementations, for example when different TCO measurement models are used. Here, the level 202 includes modeling aspects labeled Routine administration, Monitoring, Service and Change, respectively.

Some or all of these aspects may be further divided into one or more categories in a second level 204. In some implementations, the categories are loosely based on the standard structure defined in the OSI model. For example, the Routine administration aspect is here divided into Hardware, Network, Operating System (OS), Database, Netweaver and Applications categories. Netweaver here refers to the NetWeaver® platform from SAP AG. Thus, such categories can be used to structure and organize expenses for routine administration, and particularly reflect whether such administration relates to issues such as hardware, database, or applications.

At a third level 206, the model 200 here includes exemplary elements 208. This layer can be defined based on the architecture of the IT system and the processes arising from the lifecycle of the system's components. In the present example, a dividing line has been drawn between, on one hand, aspects of the model 200 that are structural and that do not have functional meaning (labeled Structure), and on the other hand, aspects that relate to elements that are functional (labeled Elements). Other organizations can be used.

Here, an exemplary element 208A is labeled Content activation and is considered an activity element, because activating content is a task that is performed in the IT system, perhaps on a regular basis. Thus, the element 208A is an example of an activity element that represents a defined task to be performed in the system. An exemplary element 208B is labeled Check prerequisites and is considered a monitoring element, because checking prerequisites is a task that involves observing some part of the IT system and collecting necessary data to decide whether this part of the system functions properly. Thus, the element 208B is an example of a monitoring task element that represents an observation task to be performed to determine whether the system functions properly. Such monitoring can include collection of data, as mentioned. An exemplary element 208C is labeled Frequency (FRED) and is considered a frequency element and connects at least two elements in the model (here, the exemplary elements 208A and 208B). The frequency element 208C represents how often the task described by the first functional element (in this example, the content activation) results in the task represented by the second functional element (here, the prerequisites check) being performed. The frequency element can take absolute values (such as Daily or Monthly) or percentage values (such as "in 10% of cases"), to name just a few examples. Thus, the frequency element 208C is an example of a frequency element that can connect an activity element such as the element 208A with at least one other functional element such as the element 208B. The functional element can be selected among another activity element and the monitoring task element, and represents how frequently the activity element results in the other functional element being performed.

As another example, a frequency element 208D can connect an analysis element 208E to an activity element 208F, representing how often analyzing tablespaces (in the exemplary step 208E) leads to an extension of table space (in the exemplary step 208F). That is, the element 208E is an example of an analysis task element representing interpretation and decision-making. The interpretation and decision-making can be based at least on the data collected by an observation task such as the element 208B.

Thus, one of the reference values 114 can specify a best practices value for the frequency element 208C and/or the frequency element 208F, to name just one example. One exemplary way of determining the reference values 114 will now be described.

Some or all of the elements in the model 200 can be selected. For example, selections 210A and 210B can be made. In some implementations, a user makes the selections 210A-B under guidance of a graphical user interface in the TCO analysis module 100B (FIG. 1). The selection(s) can be made for the element(s) at issue to be in focus for evaluating the TCO.

A structure of the selected area from the TCO measurement model 200 can be collected. For example, here the workbench 100A or the module 100B can determine that a Business Intelligence (BI) element in the selection 210A is associated with the element 208A, which in turn is associated with the element 208B through the element 208C, and so on. In some implementations, more structural features can be obtained, such as the fact that the BI element is located under a Netweaver category in the Routine Administration aspect.

The TCO workbench 100A can generate the test plan 124 (FIG. 1) using the collected structure and contents of the functional elements. In some implementations, the test plan 124 contains one or more test cases 125 that contain measurement descriptions of all elements participating in the test case. For example, such a measurement description can be formalized using the corresponding template for the element type. For example, here the test case 125 can reflect the contents of the selections 210A-B. Such a test case can be generated taking into account interdependencies between any of the functional elements. For example, the last frequency element in the selection 210B is here shown to have an interdependency to at least another element, namely the activity element 208A.

The test case 125 can be performed to obtain at least some of the reference values 114. In some implementations, the test plan can be performed using a workbench, such as the SAP Test Workbench. Such performance can involve observing test subjects performing certain operations, interviewing test subjects, and/or consulting with experts, to name a few examples.

In some implementations, the test case 125 can be provided with a template 126. The template 126 can be configured to hold a result of performing the test case 125. That is, the template 126 can be provided so that the results of performing the test plan 124, for example when it is performed multiple times, can be collected in a standardized form. The result of the test plan 124 can be recorded using the template 126. In some implementations, the result can be recorded using the structure of the TCO measurement model 110. This can provide advantages in interpreting the result because the structure may be easily recognizable from the TCO measurement model 110 itself. As another advantage, it may be convenient to identify, from the recorded result(s), a new area for which a measurement should be performed.

Figure 3:
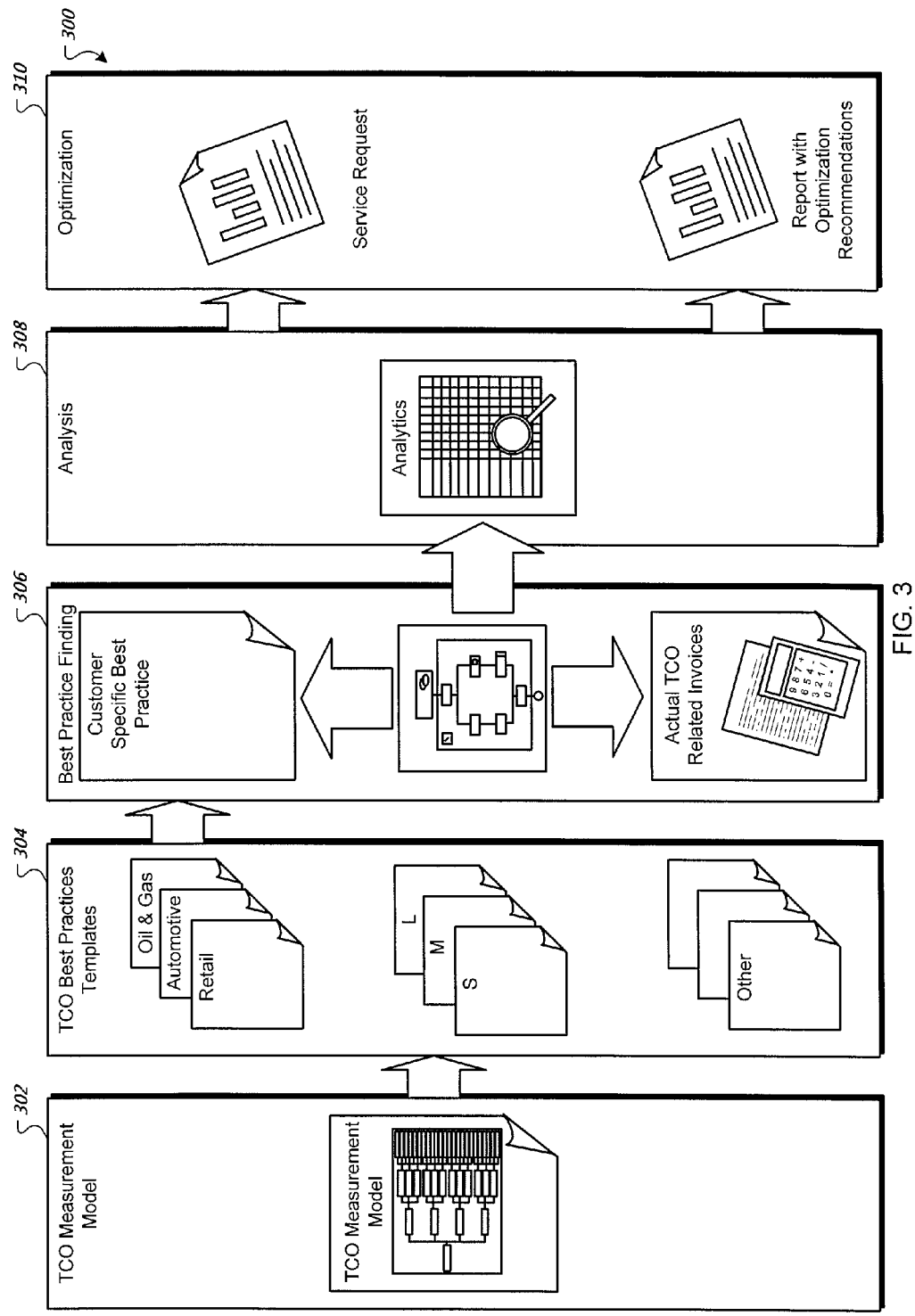
FIG. 3 schematically shows an example process of evaluating TCO for a system.

FIG. 3 schematically shows an example process 300 of evaluating TCO for a system. The process 300 can begin at a first stage 302 that involves a TCO measurement model. For example, the TCO measurement model 110 or the TCO measurement model 200 can be used.

From the TCO measurement model, best practices templates are defined in a second stage 304. For example, best practices templates can be defined for industry categories (such as Oil & Gas, Automotive and Retail). As another example, best practice templates can be defined based on the size of the organization using the IT system (here symbolized as Small, Medium and Large companies). As yet another example, best practices templates can be defined based on one or more other categories, such as the country of the organization and/or the hardware platform where the system is used.

In some implementations, some or all of the reference values 114 are included in one of the best practices templates, and this best practices template is associated with a characteristic (such as the industry categories or sizes mentioned in the example above). The characteristic can reflect an industry where the system is used, a size of the system, a size of an organization that uses the system, a country where the system is used, a hardware platform that the system uses, and combinations thereof. The appropriate best practices template can then be selected by the customer based on the characteristics of the organization. That is, the reference values that are to be used in the analysis can be identified from among multiple sets of reference values. Particularly, the reference values are identified as being associated at least with the characteristic and the reference values can be obtained by accessing the best practices template. Best practices templates can be shipped with the system to the customer or can be delivered later, to name just two examples.

In a stage 306, a customer-specific best practice can be identified. For example, this can be done by matching information about the customer with any of the templates from stage 304. In some implementations, this can be done from among a set of best practices templates in the customer's possession. In other implementations, the customer can request only the customer-specific template(s) from the manufacturer, for example.

In stage 306, actual TCO related invoices are also taken into account. For example, invoices incurred as a result of operating the system can be identified and gathered. As another example, each of the invoices can be classified as being either TCO related or non-TCO-related. As another example, the customer's actual expenses can be obtained, such as from at least one of the invoices classified as TCO related. The actual expenses are mapped to the TCO model in stage 306. This and/or other processing of the invoices can be done by persons interacting with the system or by an automated routine.

In stage 308, an analysis can be performed that includes at least comparing the actual expenses to the reference values according to the mapping. Here, the customer's TCO can be compared with the best practice TCO that has the closest match, for example in terms of business size and/or industry category. For example, areas with significant deviation from the values expected according to the best practice template can be identified.

In stage 310, one or more actions can be taken in response to a result of the analysis. There may have been defined recommendations with advice regarding measures that can be taken. For example, an optimization recommendation can include helpful information regarding a system that shows a too high TCO, for optimization of processes and/or landscapes. Such optimization can include consolidating scattered components or modules, reducing the system's digital footprint or reducing the number of checking procedures, to name a few examples. Accordingly, it can be determined, for example by the TCO analysis module 100B, whether at least one of multiple predefined recommendations should be generated in response to the result. If so, the at least one predefined recommendation can be generated, for example in form of a report provided to an administrator or other user.

As another example, a service request can be generated in the stage 310. In some implementations, the service request is generated only after a determination that no recommendation can be made. For example, no recommendation may be applicable due to the severity of the TCO discrepancy, or due to the particular expenses incurred by the customer. In these and/or other situations, a service request can be generated so that the customer's system can be serviced.

Figure 4:
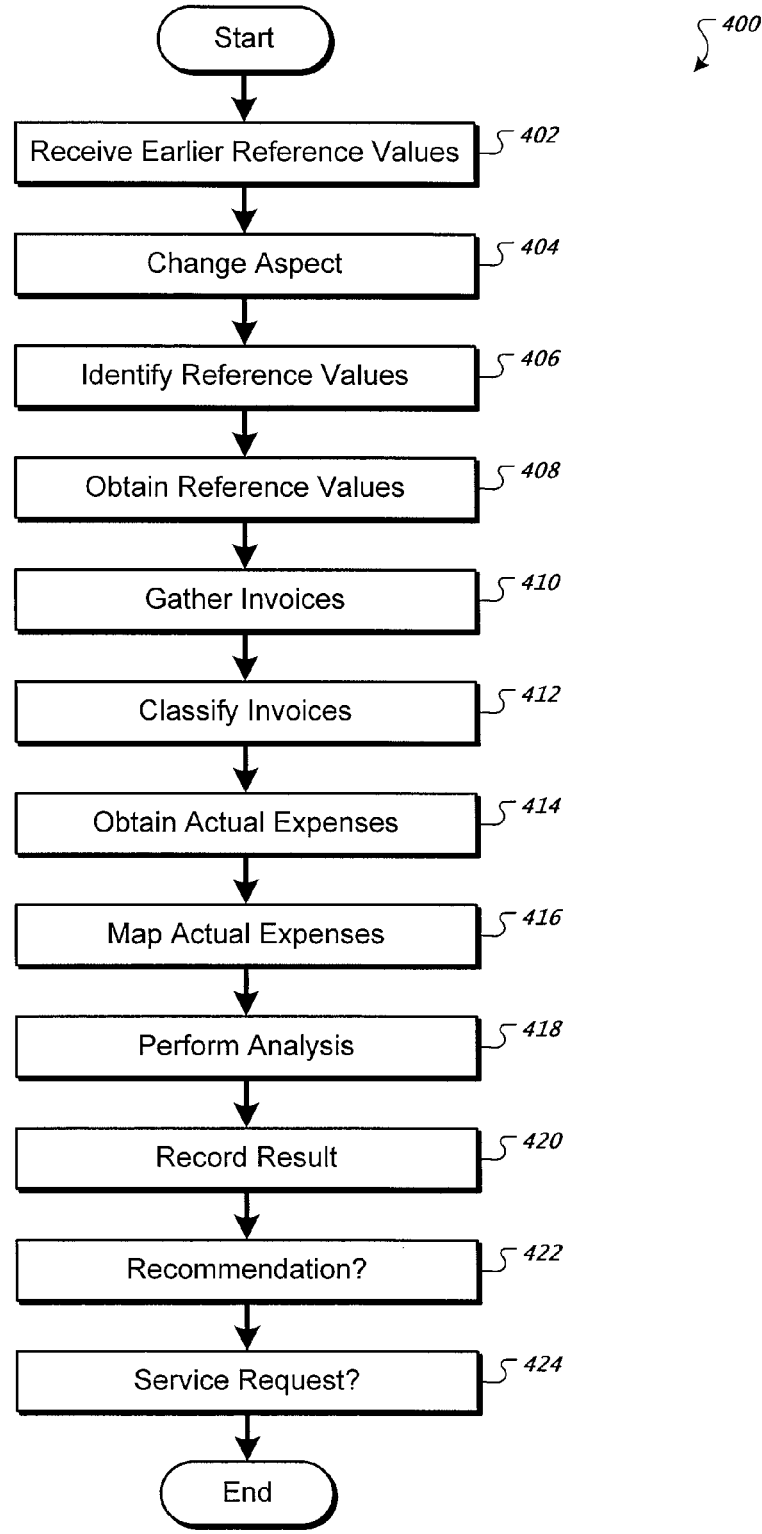
FIG. 4 shows an example of a method for evaluating TCO.

FIG. 4 shows an example of a method 400 for evaluating TCO. The method can be performed to evaluate TCO, such as in the TCO workbench 100A and/or the TCO analysis module 10B. For example, a processor executing instructions stored in a computer-readable storage medium can perform the method 400.

The method 400 includes the following steps in this example.

In step 402, earlier reference values are received. For example, the customer system 102 can receive the earlier reference values 120.

In step 404, an aspect of a system is changed. For example, the customer system 102 can have the changed aspect 122.

In step 406, reference values are identified. For example, a customer-specific best practices template can be selected in step 306.

In step 408, reference values are obtained. For example, references values can be obtained from a selected best practices template or from the reference TCO 112.

In step 410, invoices are gathered. For example, invoices may be gathered in stage 306.

In step 412, invoices may be classified. For example, invoices may be classified in stage 306 as being TCO relevant or as being non-TCO relevant.

In step 414, actual expenses are obtained. For example, actual expenses can be obtained directly from the customer's system, or from gathered invoices.

In step 416, actual expenses are mapped to a TCO measurement model. For example, expenses can be mapped to the TCO measurement model 110 or 200 in stage 306.

In step 418, analysis is performed. For example, the TCO analysis module 100B can perform analysis regarding the customer's TCO. Analysis can be performed in stage 308.

In step 420, a result is recorded. For example, the customer system 102 can record a result that the customer's TCO is slightly higher than the reference TCO 112.

In step 422, it is determined whether to generate a recommendation. For example, the TCO analysis module 100B can decide in stage 310 whether to generate any recommendation(s).

In step 424, it is determined whether to generate a service request. For example, the TCO analysis module 100B can decide in stage 310 whether to generate any request(s). In some implementations, step 424 is performed only if step 422 is answered in the negative.

More or fewer steps can be performed in other implementations. Some or all steps may be possible to perform in a different order.

Figure 5:
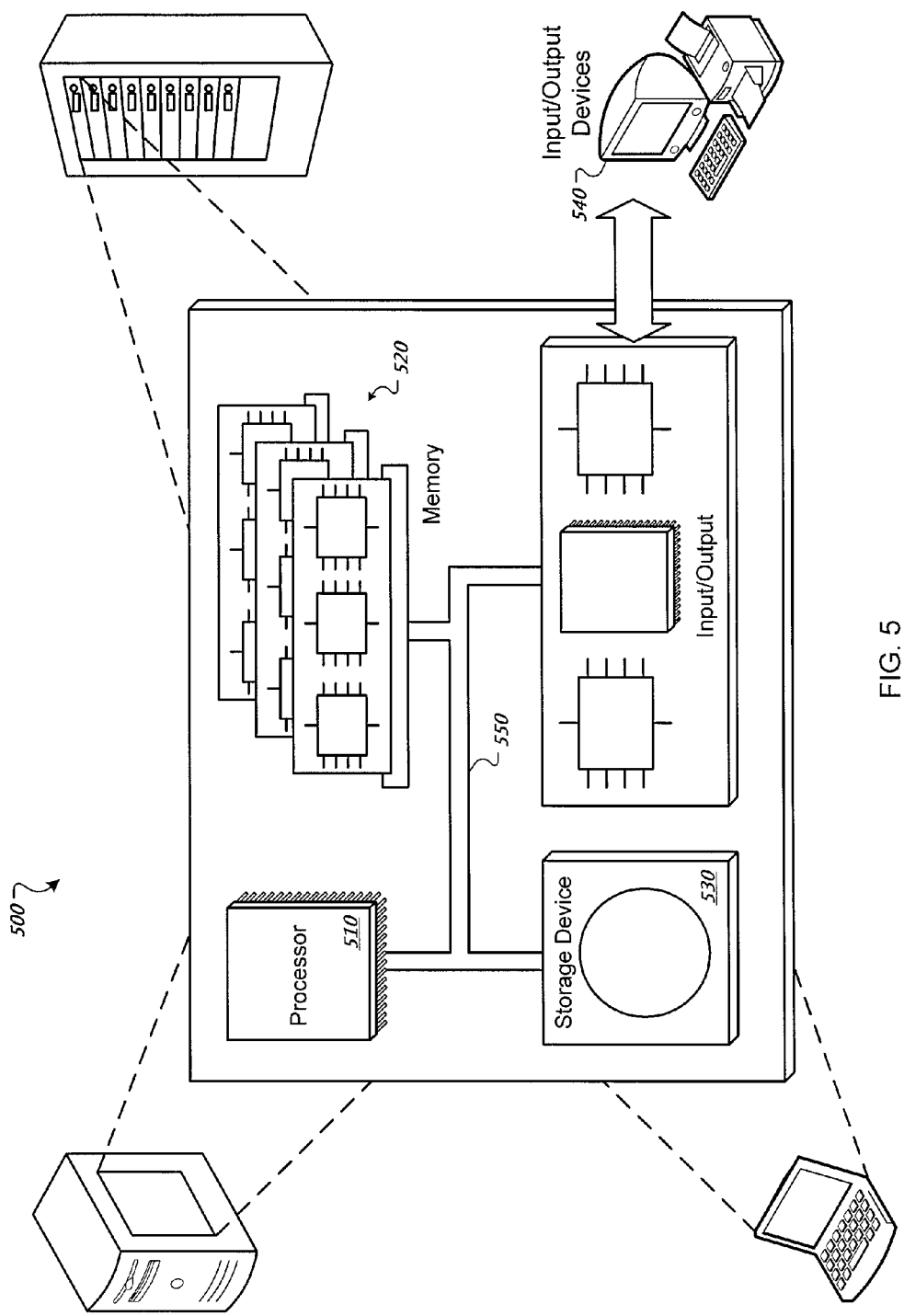
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for evaluating a total cost of ownership (TCO) of a computing system, the method comprising:
   receiving a user selection of an area within a TCO measurement model to be in focus for evaluating the TCO of the computing system under evaluation, the TCO measurement model configured for use in determining the TCO of the computing system under evaluation and comprising instances of functional elements, the instances including:
      an activity element that represents a defined task to be performed in the system;
      a monitoring task element that represents an observation task to be performed, including collection of data, to determine whether the system functions properly;
      an analysis task element representing interpretation and decision-making, based at least on the data collected by the observation task; and
      a frequency element that connects a first one of the functional elements with at least a second functional element selected among the activity element and the monitoring task element, and represents how frequently the first functional element causes the second functional element to be performed;
   obtaining reference values associated with respective aspects of the selected area of the TCO measurement model, wherein the reference values are obtained using the functional elements while taking into account interdependencies between the frequency element, the first functional element, and the second functional element, and wherein the reference values are associated with a reference TCO of a reference system;
   obtaining actual values for the computing system under evaluation by:
      operating the computing system under evaluation; and monitoring the computing system under evaluation during operation, wherein the monitoring obtains the actual values using the functional elements while taking into account interdependencies between the frequency element, the first functional element, and the second functional element;

mapping the actual values to the TCO measurement model, the actual values identified as associated with the computing system under evaluation;

performing, by a computer system, an analysis to determine the TCO of the computing system under evaluation, wherein the analysis includes comparing the actual values to the reference values according to the mapping and based on the interdependencies between the frequency element, the first functional element, and the second functional element; and recording, by the computer system, a result of the analysis that indicates at least one difference between the TCO of the computing system under evaluation and the reference TCO of the reference system, wherein the result depends on the interdependencies between the frequency element, the first functional element, and the second functional element.

2. The computer-implemented method of claim 1, wherein the computing system under evaluation has at least one characteristic, further comprising: identifying the reference values that are to be used in the analysis from among multiple sets of reference values, the reference values identified as being associated at least with the characteristic.

3. The computer-implemented method of claim 2, wherein the reference values are included in a template associated with the characteristic, and wherein the reference values are obtained by obtaining the template.

4. The computer-implemented method of claim 2, wherein the characteristic reflects at least one selected from the group consisting of: an industry where the computing system under evaluation is used, a size of the computing system under evaluation, a size of an organization that uses the computing system under evaluation, a country where the computing system under evaluation is used, a hardware platform that the computing system under evaluation uses, and combinations thereof.

5. The computer-implemented method of claim 1, further comprising:
gathering invoices incurred as a result of operating the computing system under evaluation;
classifying each of the invoices as being either TCO related or non-TCO-related; and
obtaining the actual values from at least one of the invoices classified as TCO related.

6. The computer-implemented method of claim 1, wherein the reference values are provided from a system manufacturer to a system customer.

7. The computer-implemented method of claim 6, wherein the provided reference values are an update of earlier reference values provided to the system customer, the update reflecting a change in legal requirement for operating the computing system under evaluation.

8. The computer-implemented method of claim 6, wherein the system customer has used the computing system under evaluation for a period of time before the analysis, and wherein the system customer has changed an aspect of how the computing system under evaluation is operated before the analysis is performed.

9. The computer-implemented method of claim 1, wherein the result identifies at least one of the aspects of the TCO measurement model for which a difference between the TCO of the computing system under evaluation and the reference TCO satisfies a significance criterion.

10. The computer-implemented method of claim 9, further comprising:
determining whether at least one of multiple predefined recommendations should be generated in response to the result; and
if so, generating the at least one predefined recommendation; and
if not, not generating any of the predefined recommendations.

11. The computer-implemented method of claim 9, wherein it is determined that none of the multiple predefined recommendations should be generated, further comprising:
generating a request for support service for the computing system under evaluation.

12. The computer-implemented method of claim 1, further comprising:
collecting a structure of the TCO measurement model of the selected area;
generating a test plan using the collected structure and contents of the functional elements, including taking into account interdependencies between any of the functional elements; and
performing the test plan to obtain at least some of the reference values.

13. The computer-implemented method of claim 12, further comprising:
before performing the test plan, providing the test plan with a template configured to hold a result of performing the test plan.

14. The computer-implemented method of claim 13, further comprising:
recording the result of the test plan using the template using the structure of the TCO measurement model.

15. A computer program product tangibly embodied in a non-transitory computer-readable storage medium and comprising instructions that when executed by a processor perform a method for evaluating a total cost of ownership (TCO) of a computing system, the method comprising:
receiving a user selection of an area within a TCO measurement model to be in focus for evaluating the TCO of the computing system under evaluation, the TCO measurement model configured for use in determining the TCO of the computing system under evaluation and comprising instances of functional elements, the instances including:
an activity element that represents a defined task to be performed in the system;
a monitoring task element that represents an observation task to be performed, including collection of data, to determine whether the system functions properly;
an analysis task element representing interpretation and decision-making, based at least on the data collected by the observation task; and
a frequency element that connects a first one of the functional elements with at least a second functional element selected among the activity element and the monitoring task element, and represents how frequently the first functional element causes the second functional element to be performed;
obtaining reference values associated with respective aspects of the selected area of the TCO measurement model, wherein the reference values are obtained using the functional elements while taking into account interdependencies between the frequency element, the first functional element, and the second functional element, and wherein the reference values are associated with a reference TCO of a reference system;

obtaining actual values for the computing system under evaluation by:

operating the computing system under evaluation; and monitoring the computing system under evaluation during operation, wherein the monitoring obtains the actual values using the functional elements while taking into account interdependencies between the frequency element, the first functional element, and the second functional element;

mapping the actual values to the TCO measurement model, the actual values identified as associated with the computing system under evaluation;

performing an analysis to determine the TCO of the computing system under evaluation, wherein the analysis includes comparing the actual values to the reference values according to the mapping and based on the interdependencies between the frequency element, the first functional element, and the second functional element; and recording a result of the analysis that indicates at least one difference between the TCO of the computing system under evaluation and the reference TCO of the reference system, wherein the result depends on the interdependencies between the frequency element, the first functional element, and the second functional element.

16. A computer system comprising:

a processor; and a computer readable storage medium, communicatively coupled to the processor, the computer readable storage medium including instructions that when executed cause the processor to perform a method comprising:

(1) performing analysis for a selected area within a TCO measurement model, the TCO measurement model configured for use in determining a total cost of ownership (TCO) of a computing system under evaluation and comprising instances of functional elements, the instances including:

an activity element that represents a defined task to be performed in the system;

a monitoring task element that represents an observation task to be performed, including collection of data, to determine whether the system functions properly;

an analysis task element representing interpretation and decision-making, based at least on the data collected by the observation task; and a frequency element that connects a first one of the functional elements with at least a second functional element selected among the activity element and the monitoring task element, and represents how frequently the first functional element causes the second functional element to be performed;

wherein:

the analysis includes at least comparing actual values to reference values associated with respective aspects of the selected area of the TCO measurement model according to a mapping and based on interdependencies between the frequency element, the first functional element, and the second functional element;

the reference values are obtained using the functional elements while taking into account the interdependencies between the frequency element, the first functional element, and the second functional element;

the reference values are associated with a reference TCO of a reference system; and the actual values for the computing system under evaluation are obtained by:

operating the computing system under evaluation; and monitoring the computing system under evaluation during operation, wherein the monitoring obtains the actual values using the functional elements while taking into account interdependencies between the frequency element, the first functional element, and the second functional element; and (2) recording a result of the analysis that indicates at least one difference between the TCO of the computing system under evaluation and the reference TCO of the reference system, wherein the result depends on the interdependencies between the frequency element, the first functional element, and the second functional element.

17. The computer system of claim 16, wherein the computer system is a customer system, further comprising:

earlier reference values provided to the customer system, wherein the provided reference values are an update of earlier reference values, the update reflecting a change in legal requirement for operating the computing system under evaluation.

18. The computer system of claim 17, wherein a system customer has used the computing system under evaluation for a period of time before the analysis, further comprising:

a changed aspect of how the computing system under evaluation is operated, the aspect being changed before the analysis is performed.

19. The computer system of claim 16, further comprising:

a significance criterion, wherein the result identifies at least one of the aspects of the TCO measurement model for which a difference between the TCO of the computing system under evaluation and the reference TCO of the reference system satisfies the significance criterion.

20. The computer system of claim 19, further comprising:

multiple predefined recommendations, wherein the computer system determines whether at least one of the multiple predefined recommendations should be generated in response to the result; and if so, generates the at least one predefined recommendation, and if not, does not generate any of the predefined recommendations.

21. The computer system of claim 20, further comprising:

a request for support service for the computing system under evaluation, wherein if it is determined that none of the multiple predefined recommendations should be generated, the computer system generates the request for support service for the computing system under evaluation.

* * * * *